Figure 1:
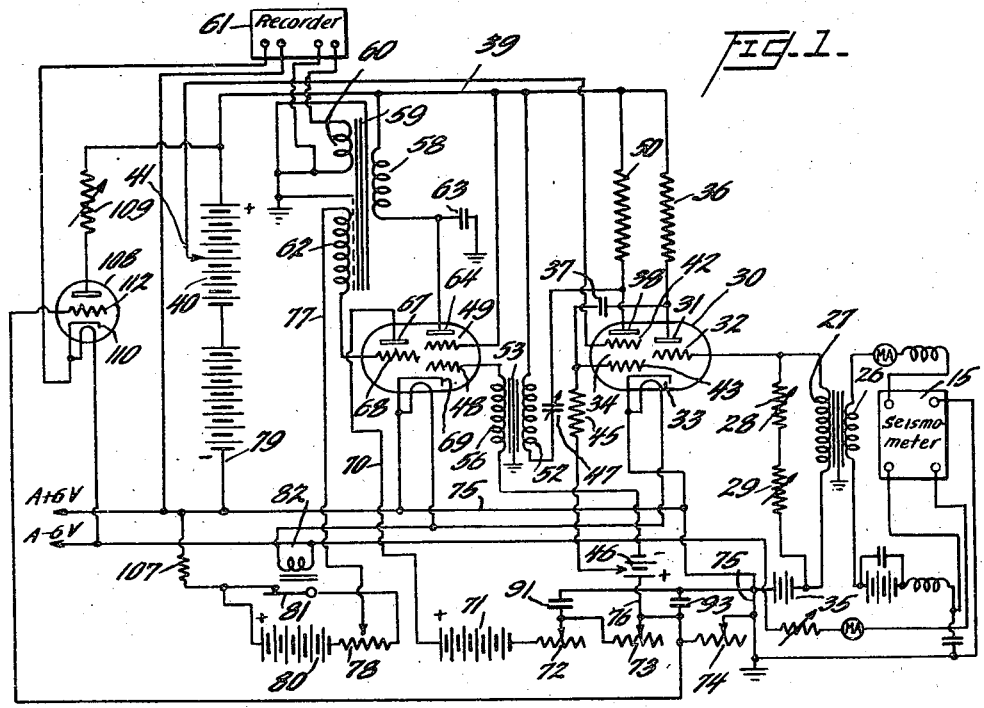

July 29, 1947.   J. O. PARR, JR   2,424,705
SEISMIC SURVEYING
Filed Jan. 6, 1945

Inventor
Josephus O. Parr, Jr.

By Watson, Cole, Grindle & Watson
Attorney

Patented July 29, 1947

2,424,705

UNITED STATES PATENT OFFICE 2,424,705

SEISMIC SURVEYING

Josephus O. Parr, Jr., San Antonio, Tex., assignor to Olive S. Petty, San Antonio, Tex.

Application January 6, 1945, Serial No. 571,625

3 Claims. (Cl. 177—352)

This invention relates to methods of and apparatus for conducting seismic surveys for use in connection with geophysical prospecting, and more particularly to apparatus and methods for amplifying and recording the seismic wave trains which have been generated by firing a charge of explosives at a remote point. A common method of geophysical exploration involves the steps of detonating an explosive charge on or at a suitable distance below the surface of the earth, detecting the resulting seismic impulses at a plurality of spaced points remote from the point of detonation, converting the seismic impulses arriving at each such point into electrical wave form energy, amplifying the energy, and finally recording the energy. Recording may be effected by the use of a multi-element galvanometer, each element being supplied with amplified electrical energy corresponding to the seismic impulses arriving at one of the spaced detecting points, the movement so imparted to the several elements being recorded photographically on a single sensitized sheet or strip of paper or the like.

The amplitude of the seismic impulses varies widely, and in order that the record of the impulses of large amplitude may be confined within the limits of the sensitized strip, while the record of the impulses of small amplitude will be of sufficient size to permit ready interpretation, it is common practice to employ amplifying equipment in which the gain is variable and is automatically controlled in response to variation in amplitude of the seismic energy being received. Amplifiers so functioning are described in various prior patents issued to me and to O. S. Petty, the gain being controlled by varying automatically the bias voltage applied to the grids of thermionic valves in the amplifier.

Of recent years the various refinements in the automatic control of gain of seismic amplifiers have made possible the variation of gain over extremely wide ranges, and with relatively short time constants. As a result, the wave amplitude on the record tends to assume greater uniformity, and differences in amplitude of the seismic waves at different parts of the wave train are less readily recognized, the effectiveness of the gain control tending to reduce or eliminate amplitude contrasts on the record. Since it is of advantage in the intrepretation of these records to recognize differences in amplitude and to locate amplitude peaks which are more or less obscured by effective amplifier gain control, the present invention contemplates the recording, preferably on the same sensitized strip and simultaneously with the recording of the seismic energy, of a curve representing the instantaneous gain of the amplifier. Thus it is possible by inspection of such a gain control curve to recognize variations in amplitude of the received seismic energy which would otherwise be obscured by reason of wide and abrupt variation in range of the amplifier gain.

In the practice of the invention, the curve representative of amplifier gain may be conveniently produced by applying to a moving element of a multi-element galvanometer a current which is proportional to the grid bias voltage applied to one or more of the thermionic valves of the amplifier for the purpose of regulating amplifier gain.

Figure 2:
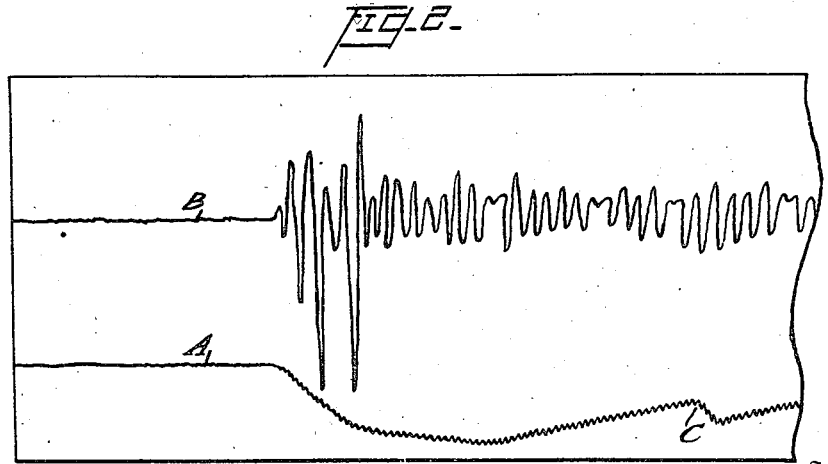

Further objects and features of the invention will be apparent from the following description taken in connection with the accompanying drawing, in which Figure 1 is a circuit diagram of an amplifier and recorder for wave form electrical signals to which the invention has been applied; and Figure 2 is a record strip or seismogram on which is recorded a curve representative of seismic energy and a curve representing concurrent amplifier gain.

In order to facilitate an understanding of the invention, reference will be made to the embodiment thereof illustrated in the accompanying drawings and specific language will be employed. It will nevertheless be understood that various further modifications of the apparatus illustrated herein, such as would fall within the province of those skilled in the art to construct, are contemplated as part of the present invention.

Referring now to the drawings for a better understanding of an actual embodiment of the invention, there is shown in Figure 1 a detector or seismometer 15 of any suitable type adapted to convert seismic energy to wave form electrical signals. These signals are fed into a suitable output circuit which includes the primary 26 of a transformer, the secondary 27 of which is shunted by a pair of variable resistors 28 and 29, one for coarse and one for fine adjustment, for manually setting the level of the signal applied to the amplifier.

The secondary 27 feeds into the cathode and grid of the thermionic valve 30 which constitutes a simple triode amplifier having the anode 31, grid 32, and heated cathode 33 which it shares in common with the elements of the second stage amplifier valve indicated at 34. A suitable biasing battery 35 is arranged in the grid circuit of the triode amplifier. This amplifier is coupled to the second stage amplifier by means of an anode coupling resistor 36 and condenser 37. The anode 31 as well as the anode 38 of the second stage valve receive their voltage supply through the common conductor 39 connected to the positive end of the battery 40. A tap 41 in this battery supplies the screen grid 42 of the second stage amplifier with a somewhat lower potential, permitting more gain and improved automatic volume control. The control grid 43 of the second stage amplifier is coupled by the condenser 37 to the anode of the first stage and receives its bias through resistor 45 from a tap on battery 46. An adjustable coupling condenser 47 and anode resistor 50 provide the coupling between the second stage anode 38 and the control grid 48 of the third stage amplifier valve 49. Condenser 47 acts in the nature of a filter, first to avoid flow of anode current through the primary winding 52 of the interstage coupling transformer 53, thus increasing the transformer life and permitting its design to be more efficient, and second, to vary the frequency response of the amplifier, giving it the highest gain on the desired frequencies and very low gain on undesired frequencies, which effect comes from resonating the transformer primary.

The secondary winding 56 of the interstage transformer 53 connects between the control grid 48 and the bias battery 46. The output from the third stage is fed through the primary 58 of transformer 59, one secondary 60 of which delivers the amplified waves to a moving element of a galvanometer associated with and forming part of a recorder 61. Another secondary 62 takes off a portion of the output of the amplifier for supply to the automatic volume control valve as will be further described hereinafter. The condenser 63 between the anode 64 of the third stage valve and ground serves to by-pass high frequencies and to resonate the output transformer to assist in the desired filter action. At the same time, this condenser performs the important function of assisting in the damping of the moving element of the galvanometer.

In the same envelope with valve 49 is a triode, which may for convenience be referred to as the A. V. C. valve, comprising anode 67, grid 68, and the common heated cathode 69 which functions also with the elements of the third stage amplifier. The anode 67 is connected by wire 70 to a separate source 71 of anode voltage, the negative pole of which leads through variable resistors 72, 73, and 74 back to wire 75 connected to the positive end of the source of heater current and common ground terminal. It will be noted that bias battery 46 is connected by wire 76 to the slider of the resistor 73 and hence is also connected to the ground through resistor 74 which is arranged in shunt with condenser 93. The battery 71 may have a potential of about 45 volts for the type of valve shown, while the value of resistors 72, 73, and 74 may be of the order of 200,000 ohms each. A condenser 91 is connected across resistors 73 and 74 to ground.

The grid 68 of the A. V. C. valve is fed from the secondary 62 of the output transformer 59, the opposite end of which is connected by conductor 77 to the slider of a potentiometer 78 energized from battery 80, through the contacts 81 of a relay, the winding 82 of which is in series with the heaters of valves 30 and 49, the positive terminal of battery 80 being returned to the cathode of the A. V. C. valve through resistor 107.

The slider on the potentiometer 78 is set to supply a sufficiently negative bias to the control grid 68 of the A. V. C. valve to normally prevent the flow of any anode current in that valve. Preferably the valve is thus biased substantially beyond cut-off, and flow of anode current occurs only during positive swings of the output signal of sufficient magnitude to drive the grid across the cut-off point toward the positive side. Thus whenever the positive potential supplied from the transformer winding 62 becomes sufficiently high, the grid will permit the flow of current to anode 67.

It will be seen that when no current is flowing in the anode circuit of the A. V. C. valve, the positive pole of battery 46 is substantially at ground potential. The bias on grids 43 and 48 of the second and third stage amplifier valves is therefore determined by the potential of the battery 46 and the gain of the amplifier is fixed thereby. However, when current flows in the anode circuit of the A. V. C. valve through the resistors 72, 73 and 74, the potential of the conductor 76 becomes negative with respect to ground by an amount corresponding to the voltage drop across the resistor 74, and the bias on the grids 43 and 48 is thereby rendered more negative to reduce the gain of the amplifier.

Condensers 91 and 93 are of relatively large capacity, for example of the order of one microfarad, and in conjunction with resistances 72 and 73, constitute a time delay circuit preventing immediate reduction of sensitivity in the amplifier on the arrival of the single impulse of large amplitude, the negative bias on the amplifier valves gradually increasing during the arrival of several successive impulses of high amplitude while the condensers 91 and 93 are being charged, so that noticeable distortion is avoided. Again, these condensers hold the charge thereby imparted to them for a considerable period of time, the rate of discharge being determined by the setting of the resistors 73 and 74.

Thus on the arrival of the earlier waves of excessively large amplitude, the grid 68 of the A. V. C. valve is driven sufficiently positive by the signal energy derived from the output transformer secondary 62 to cause a flow of current to the anode 67, thereby charging the condensers 91 and 93 and applying a more negative bias to the grids 43 and 48 of the amplifier valves to reduce the gain of the amplifier. The setting of the resistor 78 determining the bias on the A. V. C. valve should be such that each of the swings of the signals derived from these excessively large waves causes the A. V. C. valve to function and therefore the charging of condensers 91 and 93 continues until such waves have passed. The first of the reflected waves may be normally too small to cause functioning of the A. V. C. valve but the gain of the amplifier does not immediately return to normal since the charge on condensers 91 and 93 leaks off slowly and hence the bias on the amplifier grids 43 and 48 becomes more positive gradually. The time required for this charge to leak off can be set by appropriate adjustment of resistor 74 to extend substantially for the time during which it is desired to record the reflected waves, or preferably for a lesser time in order to ensure adequate amplification throughout the record, the gain slowly increasing as the strength of the waves is reduced because of the lowering voltage on 91, producing a chart of reasonably uniform character. In the event of arrival during this period of waves sufficiently large to again render the A. V. C. valve operative, the charging of condensers 91 and 93 is repeated.

As hereinbefore indicated, it is customary to employ a plurality of seismometers disposed at spaced points, each seismometer delivering electrical energy corresponding to the received seismic impulses to a separate amplifier, the output of each amplifier being fed to one of the moving elements of a multiple oscillograph, for instance a multi-string galvanometer. The movements of the several elements of the oscillograph are then recorded on a moving sensitized strip or the like.

It will be understood that in a multiple system employing a plurality of seismometers and associated amplifying units with a multiple oscillograph, the grid bias varying means illustrated herein need not be duplicated in each amplifier since the charge applied to condensers 91 and 93 of one amplifier unit may be used to vary the grid bias of the amplifier valves in the other amplifying units of the series, with resulting simplification in the circuits of such units.

Returning now to the drawing it will be observed that a further thermionic valve 108 is employed to form a record of the amplifier gain, the anode of the valve being connected through a variable resistor 109 to the positive terminal of battery 40, the cathode 110 being connected through a moving element of the recorder 61 to ground. Thus the anode current of valve 108 energizes one of the moving elements of the recorder, to produce a record trace. The grid 112 of valve 108 is connected to wire 76, to which is supplied the negative potential which controls the amplification or gain of amplifier valves 34 and 49, and thereby the gain of the amplifier. It will thus be apparent that as the potential on wire 76 is varied as hereinbefore explained, the anode current of valve 108 will vary accordingly, and the moving element of the recorder which is energized by this anode current will produce a record of the progressive gain of the amplifier.

In Figure 2 is shown a seismogram or record strip on which has been traced curve A, produced in the manner just described to represent the amplifier gain, and curve B, a seismic trace representing the output of such amplifier. The usual seismogram includes a plurality of similar seismic traces but these are omitted for convenience.

It will be observed that in this instance the amplifier gain decreases to a minimum value during the arrival of the earlier high amplitude waves, and thereafter increases gradually toward the end of the record. At the point C there is an interruption in this gradual upward trend of the amplifier gain, the gain decreasing momentarily as the result of arrival of further energy of amplitude sufficiently high to actuate the amplifier A. V. C. It will be noted that the contrast between these high amplitude waves and the adjacent portions of the wave train is not clear from the seismic trace B because of the prompt action of the A. V. C. in reducing the gain. However, it is apparent from an inspection of the gain curve A that a decided increase in amplitude occurs at this point, and this fact may be considered in interpreting the record.

The concurrent recording of the amplifier gain is also of assistance in determining whether the amount of explosive employed is excessive. For instance, if the amplifier gain at the end of the record is substantially below maximum, it is evident that improved results could be achieved by employing less explosive, and allowing the amplifier to increase the weak signals to the proper level, thereby saving explosives and causing less damage to shot holes, so as to permit the shooting of a greater number of charges in the same hole and at substantially the same depth.

It will be appreciated that in its broader aspect the invention involves the use, in combination with a seismic system employing amplifiers in which the gain is automatically controlled, varying in part in response to variation in amplitude of received seismic energy, and in part as a function of time, of means for recording such variation in gain concurrently with the recording of the amplified seismic energy.

Having thus described the invention, what is claimed as new and desired to be secured by Letters Patent is:

1. In apparatus for recording seismic waves, the combination with means for receiving and converting seismic waves into electrical wave form signals, of an amplifying and recording system for said signals, said system including means operable automatically, in part in response to variation in amplitude of the received seismic waves, and in part as a function of time, to vary the extent to which said signals are amplified to provide a visual wave form record of varying amplitude, and devices associated with said system for recording, concurrently with the recording of said wave form record, a visual record of the progressive variation in signal amplification.

2. In apparatus for recording seismic waves, the combination with means for receiving and converting seismic waves into electrical wave form signals, of a thermionic valve amplifier for amplifying said signals, recording means for recording the amplified signals to provide a visual wave form record of varying amplitude, means operable automatically, in part in response to variation in amplitude of the received seismic waves, and in part as a function of time, to vary the extent to which said signals are amplified, said means including apparatus for applying a varying bias voltage to the grid of a valve in said amplifier, and means operable by variation in such bias voltage and operatively connected with said recording means for recording, concurrently with the recording of said wave form record, a visual record of the progressive variation of signal amplification.

3. In apparatus for recording seismic waves, the combination with means for receiving and converting seismic waves into electrical wave form signals, of a thermionic valve amplifier for amplifying said signals, a multiple recording oscillograph, means delivering the amplified signals to said oscillograph to reproduce such signals as a visual wave form record of varying amplitude on a sensitized strip, devices operable automatically to vary the extent to which said signals are amplified, said devices including apparatus for applying a varying bias voltage to the grid of a valve in said amplifier, and means operable in response to variation in such bias voltage for delivering to said oscillograph, for recording concurrently with the recording of said signals, and on the same sensitized strip, a visual record of the progressive variation of signal amplification, said last named means including a thermionic valve, means feeding the output of said last named valve to said oscillograph, and means applying to the grid of said last named valve the said bias voltage.

JOSEPHUS O. PARR, Jr.

REFERENCES CITED

The following references are of record in the file of this patent:

UNITED STATES PATENTS

| Number | Name | Date |
|---|---|---|
| 1,623,756 | Sacia | Apr. 5, 1927 |
| 2,333,321 | Leathers | Nov. 2, 1943 |
| 2,354,420 | Minton | July 25, 1944 |
| 1,784,522 | Harrison | Dec. 9, 1930 |
| 1,925,608 | Round | Sept. 5, 1933 |